(12) United States Patent
Weiss et al.

(10) Patent No.: US 6,321,851 B1
(45) Date of Patent: Nov. 27, 2001

(54) HITCH MECHANISM FOR COUPLING IMPLEMENTS TO A VEHICLE

(75) Inventors: Heinz Weiss, Bensheim; Gerd Bernhardt, Hänichen; Mario Wünsche, Radeberg; Sergiy Fedotov, Dresden, all of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/685,807

(22) Filed: Oct. 10, 2000

(30) Foreign Application Priority Data

Oct. 28, 1999 (DE) .............................................. 199 51 840

(51) Int. Cl.$^7$ .................................................. A01B 59/04
(52) U.S. Cl. ...................... 172/444; 280/456.1; 280/477; 280/482
(58) Field of Search ................................. 280/456.1, 477, 280/482; 172/444, 439, 677, 679, 684.5, 668

(56) References Cited

U.S. PATENT DOCUMENTS

| | | | |
|---|---|---|---|
| 3,425,715 | 2/1969 | Weitz | 280/479 |
| 3,432,184 | 3/1969 | Tweedy . | |
| 4,059,283 | 11/1977 | Shelton | 280/461 A |
| 4,125,271 | 11/1978 | Wilboltt et al. | 280/461 A |
| 4,360,216 | 11/1982 | Wiemers | 280/479 R |
| 4,437,680 | * 3/1984 | Della-Moretta | 280/460 R |
| 5,092,409 | 3/1992 | Defrancq | 172/4.5 |
| 5,195,261 | 3/1993 | Vachon | 37/231 |
| 5,697,454 | 12/1997 | Wilcox et al. | 172/447 |
| 5,997,024 | 12/1999 | Cowley | 280/478.1 |

FOREIGN PATENT DOCUMENTS

| | | |
|---|---|---|
| 196 37 547 A1 | 3/1998 | (DE) . |
| 197 20 049 | 11/1998 | (DE) . |
| 2698517 | 6/1994 | (FR) . |

OTHER PUBLICATIONS

Duncan and Wegscheid, "Off–Road Vehicle Simulation For Human Factors Research" ASAE Paper No. 82–1610, Dec. 14–17, 1982.
"Klinematik und Robotik", Date unknown.
"Maschinemarkt—Das IndustrieMagazin", May, 1999.
Sunco, "Acura Trak Guidance Control", Date Unknown.
HR Manufacturing, "Navigator Row Crop Guidance System", 1989.

\* cited by examiner

Primary Examiner—Christopher J. Novosad

(57) ABSTRACT

A hitch mechanism for coupling an implement to a utility vehicle includes a coupling frame and six variable length links. The frame has couplers for coupling to the implement. Each link has a first end coupled to the vehicle and a second end coupled to the coupling frame. The links are preferably arranged in the form of a hexapod, so that, in addition to the functions of known three-point hitches, the implement may be steered sideways or shifted sideways, and so that the motion of the coupling frame has six degrees of freedom.

10 Claims, 2 Drawing Sheets

HITCH MECHANISM FOR COUPLING IMPLEMENTS TO A VEHICLE

BACKGROUND OF THE INVENTION

The invention relates to a hitch mechanism for coupling implements to a utility vehicle.

There are various known hitch or implement coupling mechanisms for coupling an agricultural implement to an agricultural vehicle. One such hitch is the conventional three-point implement hitch, as it is defined by standards ISO 730 or DIN 9674. However, an implement cannot be steered with a conventional three-point hitch. There are guidance mechanisms, such as the Acura Trak from Senco Marketing, which can steer an attached implement, but these mechanisms do not permit a pure lateral shifting of an attached implement. U.S. Pat. No. 5,697,454 shows a mechanism which is pivoted about a vertical pin and which therefore does not permit sideways shifting. Furthermore, there are row guidance mechanisms such as, for example, the "Navigator" from the HR Manufacturing Company, which permit a sideways shifting, but do not provide any implement steering capability.

U.S. Pat. No. 3,432,184 describes a tractor implement hitch which has a triangular plate to which a triangular implement coupling plate can be fastened. Seven variable length actuators extend between the tractor frame and the plate, and have first ends connected to four connecting joints on the tractor frame. Two generally horizontal upper actuators are oriented in a V-shaped pattern with respect to each other and converge with their second ends at an upper joint of the plate. Two generally horizontal lower actuators are oriented parallel to each other and have second ends coupled to lower connecting points on the plate. Two inclined lifting actuators are oriented parallel to each other. They have first ends coupled to the first ends of the upper actuators and have second ends coupled with the second ends of the lower actuators. A lower stabilizing actuator is coupled between the first end of one lower actuator and the second end of the other lower actuator. This hitch is intended to permit rapid and simple attachment of an implements without requiring a precise alignment of the tractor to the implement. The actuators are also used to raise and lower the implement during operation. However, the functions of this hitch are limited. For example, with this hitch an implement cannot be shifted or steered sideways.

"Kinematik und Robotik", by Manfred Husty, Adolf Karger, Hans Sachs, and Waldemar Steinhilper, published in 1997 by x. Springer-Verlag, pages 491–524, describes a mechanism which includes six variable length links coupled between a pair of triangular plates. In this mechanism the links form closed kinematic chains, wherein pairs of the links are connected to a common base or body. A similar mechanism has also been used to support and move a tractor cab in an off-road vehicle simulator, as described by Duncan and Wegscheid in "Off-Road Vehicle Simulation for Human Factors Research", ASAE Paper No. 82-1610 (1982). However, these references do not show such a mechanism in use as a vehicle-implement hitch.

SUMMARY OF THE INVENTION

Accordingly, an object of this invention is to provide a vehicle-implement hitch mechanism which permits a sideways steering function and a sideways shifting of the implement.

A further object of the invention is to provide such a hitch mechanism which reduces sideways forces transmitted from the implement to the vehicle during operation.

A further object of the invention is to provide such a hitch mechanism which accommodates motions with six degrees of freedom.

A further object of the invention is to provide such a hitch mechanism which enables easy coupling of implements.

These and other objects are achieved by the present invention, wherein a hitch mechanism for an agricultural tractor includes three pairs of links arranged in closed kinematic chains in such a way that an implement coupling frame can be moved with six degrees of freedom. A first end of each link is pivotally coupled to the vehicle body, and a second end of each link is pivotally coupled to the coupling frame. The links are loaded only in compression and tension, and not in bending. Preferably, the links are arranged in the form of a hexapod, such as described in German patent 197 20 049, or as described in ASAE Paper No. 82-1610 (1982).

The first ends of the links are connected to the vehicle in three pairs, each pair positioned near to corner points of a triangle. The second ends of the links are connected to a triangular implement coupler frame in three different pairs, each pair being positioned near to corner points of the frame. Ideally, two links would converge precisely in each of the corner points, where the two links include a relatively large angle towards each other, so that the forces transmitted by the links can be well controlled. However, such a common connecting joint of two links is difficult to design. For this and other reasons, it is advantageous that the link ends be arranged merely in the vicinity of the particular theoretical corner point of the triangle, so that the actual connecting joints of two links are located not exactly but only approximately at the corner points of the triangle.

This hitch can be mounted on the rear or the front of a utility vehicle, and with variable length links the coupling frame is movable with in six degrees of freedom (three rotations, three translations). With six degrees of freedom, various functions can be performed, which a known three-point hitches cannot perform. To provide a known three-point hitch with such additional functions would require additional mechanical repositioning arrangements or additional hydraulic cylinders had to be provided (for example, hydraulic upper steering arms, hydraulic lifting strut, hydraulic side stabilizers and others), but without the versatility of the present invention.

The length of the links can be selected largely independent of one another. The relationship of the lengths to each other can be adjusted as desired by an appropriate control. By an appropriate adjustment of each of the lengths of the links of this hitch mechanism, an implement can be shifted vertically, laterally and in the longitudinal direction of the vehicle. The implement may also be rotated about an axis transverse to the vehicle or about a vertical axis. The implement can also be rotated with respect to the utility vehicle about a longitudinal axis of the vehicle. With this hitch the implement may steered sideways or shifted sideways. Thus, in addition to providing the functions of a conventional three-point implement hitch (raising and lowering of an implement), this hitch mechanism also makes possible an easy coupling of implements to the utility vehicle, without the need for moving the entire vehicle or the implement. It is also possible by varying the lengths of the links to change the spacing between the rear (or the front) of the utility vehicle and the coupling frame, in addition to a height adjustment and a sideways adjustment. By the application of various couplers, implements may be coupled to the coupling frame. Thus, an automatic coupling and uncoupling of implements becomes possible when the vehicle is stopped.

Further, an implement can be steered and shifted sideways during its operation in order to reduce transmission of side forces to the tractor. By optimizing the side forces the maneuverability and the steerability of the complete system (tractor and implement) can be improved.

The angle between the longitudinal axis of the vehicle and that of the implement (as well as that between the implement and the ground) can be adjusted as desired. In particular, the adjustment angle between the implement and the ground can be readjusted independently of the lifting height, or it can be retained as constant over a large range of lifting heights.

With this hitch the implement may be pivoted during travel. The implement can also be shifted sideways, for example, in order to shift the center of gravity of the entire system toward the slope while operating on a slope. A reduction of the turning radius and an improvement in the maneuverability of the entire system can also be attained by automatically pivoting the implement during operation around a curve, so that, for example, during operation through narrow passages collisions due to outward pivoting of the implement are avoided. By changing the distance between the utility vehicle and the implement coupling frame, the center of gravity of the entire system can be shifted upward and downward and to the right and left. By shifting the center of gravity sideways the stability of the entire system can be improved during transport operation, during ground-breaking operations and during operations on a slope.

The coupling frame can be translated or rotated into a desired position by a controller which calculate a coordinate transformation and generates control signals for adjusting the length of the links. Such a controller can adjust the position of the coupling frame and the implement more precisely than can be done with a conventional three-point hitch. Desired lengths of the links can be stored in a memory of such a controller, and recalled as needed by the controller, so that standard positions or operating cycles can be repeated easily and rapidly, for example, for the lowering and lifting of the implement. Such a controller could be coupled with a mapping and/or a GPS data base to provide an effective operational control.

In place of the triangular coupling frame, a so-called single-phase coupler could be used. Such a coupler would include two legs connected together in a V-shape with an upper apex and with the legs diverging in a downward direction. The single-phase coupler would operate similar to the plate described in US-A-3,432,184, and would be able to accept a coupling plate. The upper apex and the two lower free ends of the single-phase coupler form a triangle. One end of at least two variable length links would be connected near to the corner points of this triangle.

Electrical connectors, hydraulic connectors and sensor connectors can be mounted on the coupling frame for connecting to the vehicle.

Preferably, the frame-side triangle and the vehicle-side triangle are configured as similar triangles. These triangles are preferably equilateral triangles or isosceles triangles. The symmetrical arrangement simplifies the engagement of the links, by means of which the coupling frame is repositioned or moved in six degrees of freedom. Preferably the frame-side triangle and the vehicle-side triangle in a base position or initial position are generally indexed with respect to each other by 180. Preferably, the vehicle-side triangle is smaller than the implement-side triangle so that the links of the hitch converge so that forces transmitted from the implement to the utility vehicle are directed towards a desired location.

The links are preferably double-acting hydraulic cylinders, or electromechanical repositioning elements. By the use of hydraulic cylinders large forces can be applied by simple means, for example, for the lifting of the implement, while electromechanical repositioning elements offer a simple, easily controlled repositioning possibility. The pressure in the hydraulic cylinder can be sensed and used for the determination of the mass of the implement.

DESCRIPTION OF THE PREFERRED EMBODIMENTS

Figure 1:
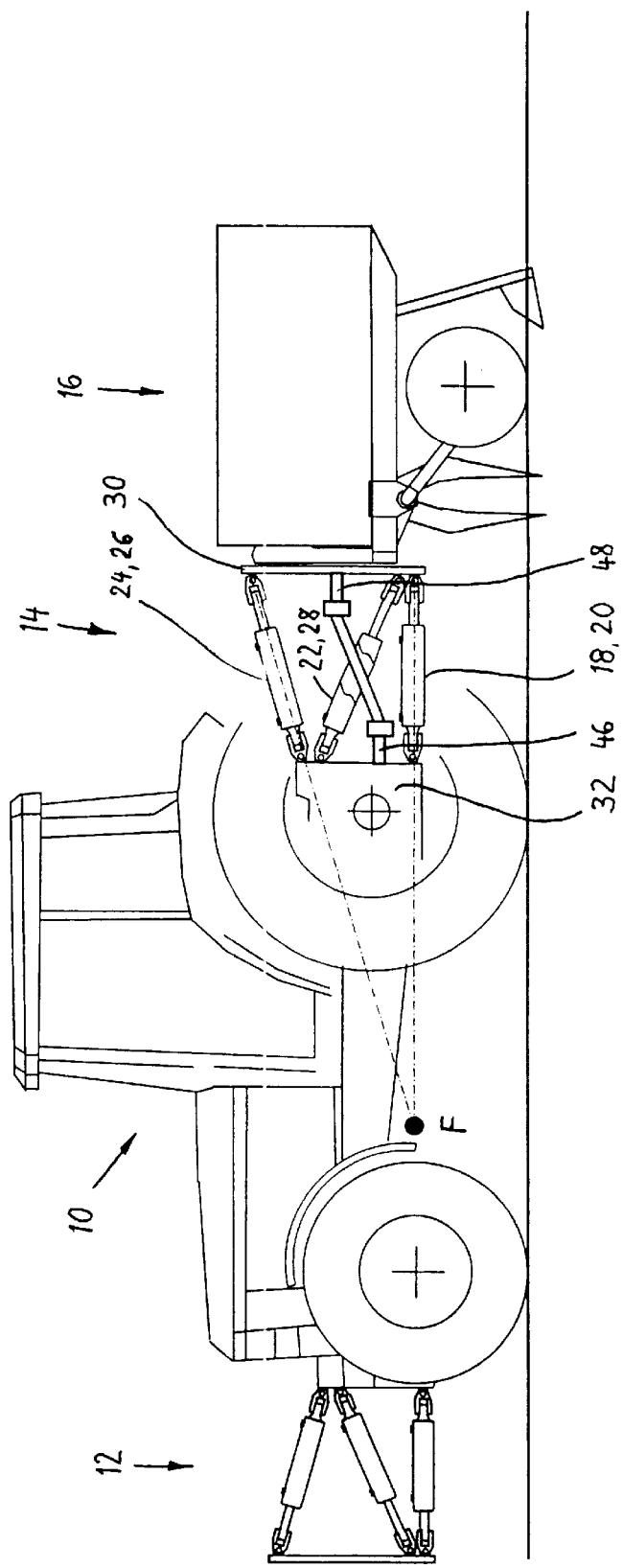
FIG. 1 is a side view of a utility vehicle with a front side and a rear side hitch mechanism configured according to the invention.
Figure 2:
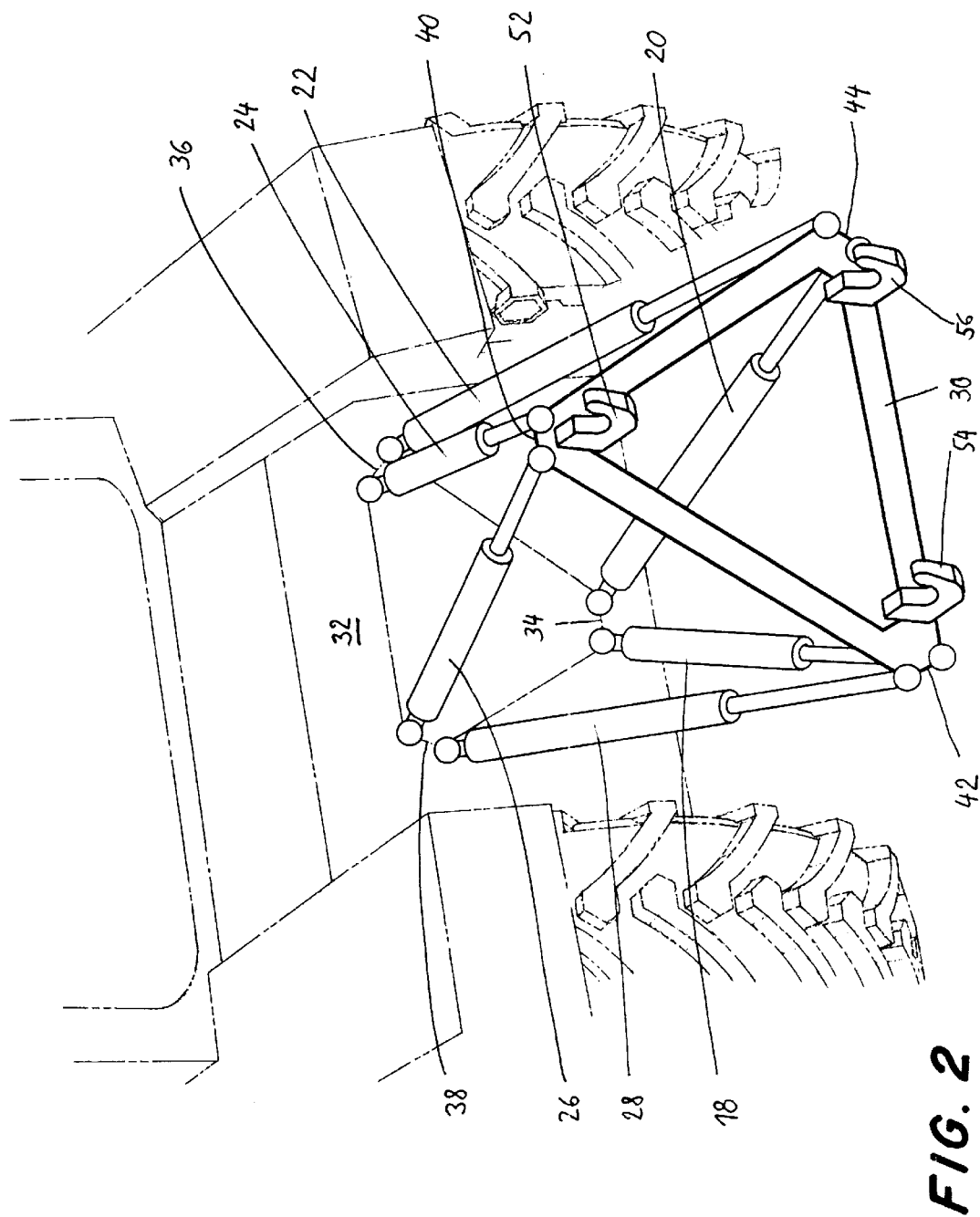
FIG. 2 is a schematic perspective rear view of a hitch mechanism according to the invention.

Referring to FIG. 1, a front hitch 12 and a rear hitch 14 are mounted on an agricultural tractor 10. The rear hitch 14 includes six variable length links 18, 20, 22, 24, 26 and 28, and a frame 30 to which an implement 16 is coupled. Details of the hitch mechanisms are shown in FIG. 2, wherein the same or corresponding components are identified by the same reference numbers. Preferably, the coupling frame 30 has a generally triangular shape. Implement couplers, for the attachment of an implement, are mounted on the frame 30, for example, in the region of its corners. A variety of known coupling means are available for selection.

Each link has a first end which is connected to the vehicle body 32, for example, to the differential housing or to the vehicle frame. Each link has a second end which is connected to the coupling frame 30.

The first ends of the links 18–28 are coupled in three pairs to a position near the corner points 34, 36, 38 of a vehicle-side triangle. One of these corner points 34 is located at a low level and in the center relative to the transverse direction of the vehicle. The corner points 36, 38 are located together at the same elevation, above the low corner point 34, and are arranged symmetrically about the transverse direction of the vehicle. The second ends of the links 18–28 are coupled in three different pairs to a position near the corner points 40, 42, 44 of a triangular-shaped frame 30. One of these corner points 40 is located at a high elevation while the corner points 42, 44 are located at the same elevation and below the high level corner point 40.

Adjacent pairs of the links generally form a triangle or a closed chain. With such a hitch, all functions, among others, of a conventional three-point implement hitch can be provided. The triangles formed the link first ends and by the frame 30 may be equilateral triangles or isosceles triangles. Isosceles triangles that extend relatively far in the vertical direction may be advantageous if particularly large vertical forces must be absorbed by the hitch.

A first link 18 has one end connected in the vicinity of the low level vehicle-side corner point 34 and has its other end connected near corner point 42. A second link 20 has one end connected near the low level vehicle-side corner point 34 and has its other end connected near corner point 44. A third link 22 has one end connected near corner point 36 and has an other end connected near corner point 44. A fourth link 24 has one end connected near corner point 36 and has an other end connected near corner point 40. A fifth link 26 has one end connected near corner point 38 and has an other end connected near corner point 40. A sixth link 28 has one end connected near corner point 38 and has an other end connected near corner point 42.

The links 18–28 are arranged so that adjacent pairs of links form, together with a portion of the vehicle-side triangle or with a portion of frame 30, triangles. The vehicle-side corners 34, 36, 38 and the frame 30 both form triangles which are similar to each other, but which are rotationally shifted 180 degrees with respect to each other.

The triangle formed by corners 34–38 is somewhat smaller than the triangle formed by frame 30, so that pairs of the links have axis which converge in a forward direction of the tractor 10. For example, the axis of links 26 and 20 converge at a point on a transverse horizontal line F. The axis of links 24 and 18 converge at a point on the horizontal line F which is spaced apart from the convergence point of links 20 and 26. As best seen in FIG. 1, line F is positioned forward of the hitch 14 and is forward of the rear wheel of tractor 10 and slightly rearward of the front wheel. Furthermore, by changing the lengths of all or different combinations of the links 18–28, the location of line F can be shifted vertically or in the fore-and-aft direction of the vehicle, and the location of the convergence points can be shifted. Thus, it is possible to vary the effect on the rear axle of the load transmitted from an implement to the vehicle 10.

The vertical orientation of the coupling frame 30 can be maintained during the lifting and lowering of the implement 16. This is particularly advantageous during ground breaking operations using power take-off shafts, since during the lifting and lowering of the implement the orientation of the vehicle-side power take-off shaft 46 and the orientation of the implement-side power take-off shaft 48 can be maintained, so that the angular velocity of the power take-off shaft does not change as a result of the lifting movement.

The variable length links 18–28 are, for example, double-acting hydraulic cylinders or electromechanical repositioning elements. The links 18–28 are preferably connected via ball joints or universal joints so that they are free to pivot in all directions relative to the vehicle body 32 and to the coupling frame 30. If the cylinders 22 and 28 are allowed to move freely, then the hitch can freely move (float) in response to forces acting on the hitch. If the links 18, 20, 24, 26 are not allowed to float, then lateral movement of the hitch would be prevented and the hitch can move only in an up-and-down direction.

As best seen in FIG. 2, the coupling frame 30 has three legs which form a closed triangle. The six links 18–28 are coupled to locations near the corners of the frame 30. Upwardly opening hooks 52, 54, 56 are mounted on the side of frame 30 facing away from the vehicle, near its corner points. Implements may be attached to these hooks. Alternatively, or in addition, other coupling devices (not shown), as well as supply and measurement connections (not shown), can be mounted on the frame 30.

Alternatively, in place of the closed frame of FIG. 2, a so-called single-phase coupler (not shown) could also be used, that is, a coupler with two legs in the shape of an inverted V, such as with the lower leg of the frame 30 omitted. A correspondingly configured part of the frame of the implement can be hooked onto such a single-phase coupler and, if necessary, locked to it, thus stabilizing the legs of the V. With such a coupler, attachment hooks, as shown in FIG. 2, can be omitted.

A control system (not shown) may be provided for generating control signals for controlling the length of the links and calculating necessary lengths of the links on the basis of target value inputs, such as target values provided as inputs by an operator. Alternatively, target values can be pre-set by an overriding control system, such as a positioning control system.

While the present invention has been described in conjunction with a specific embodiment, it is understood that many alternatives, modifications and variations will be apparent to those skilled in the art in light of the foregoing description. For example, in the vicinity of a corner point several spatially separated connectors could also be provided, so that the links can be hooked selectively into one of these connectors. By means of such a change in the guide point positions various different configurations can be selected and used. Accordingly, this invention is intended to embrace all such alternatives, modifications and variations which fall within the spirit and scope of the appended claims.

We claim:

1. A hitch for coupling an implement to a utility vehicle, comprising:

a coupling frame for coupling to the implement; and six variable length links, each link having a first end connected to the vehicle and having a second end connected to the coupling frame, the links being arranged in closed kinematic chains so that the coupling frame is movable with six degrees of freedom, the first ends of the links being coupled in three pairs to positions near to corners of a first triangle, the second ends of the links being coupled in three pairs to positions near to corners of a second triangle, and the first triangle being smaller than the second triangle so that axis of at least two of the links converge in a forward direction of the vehicle.

2. The hitch mechanism of claim 1, wherein:

the links are arranged in the form of a hexapod.

3. The hitch mechanism of claim 1, wherein:

the coupling frame forms the second triangle.

4. The hitch mechanism of claim 1, wherein:

the first ends of the links are pivotal in all directions with respect to the vehicle, and the second ends of the links are pivotal in all directions with respect to the coupling frame.

5. The hitch mechanism of claim 1, wherein:

the first triangle and the second triangle are similar to each other.

6. The hitch mechanism of claim 1, wherein:

the first and second triangles are equilateral triangles or isosceles triangles.

7. The hitch mechanism of claim 1, wherein:

the first triangle has a rotational orientation which is shifted approximately 180 degrees with respect to a rotational orientation of the second triangle.

8. The hitch mechanism of claim 1, wherein:

each link includes a hydraulic cylinder.

9. The hitch mechanism of claim 1, wherein:

each link includes a double-acting hydraulic cylinder.

10. The hitch mechanism of claim 1, wherein:

each links includes an electromagnetic repositioning element.

* * * * *